United States Patent
Hohjoh

(10) Patent No.: US 9,444,979 B2
(45) Date of Patent: Sep. 13, 2016

(54) IMAGING DEVICE AND IMAGE PROCESSING METHOD

(71) Applicant: Daisuke Hohjoh, Narashino (JP)

(72) Inventor: Daisuke Hohjoh, Narashino (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/380,832

(22) PCT Filed: Apr. 18, 2013

(86) PCT No.: PCT/JP2013/062151
§ 371 (c)(1),
(2) Date: Aug. 25, 2014

(87) PCT Pub. No.: WO2013/157662
PCT Pub. Date: Oct. 24, 2013

(65) Prior Publication Data
US 2015/0042847 A1    Feb. 12, 2015

(30) Foreign Application Priority Data

Apr. 20, 2012   (JP) ................................ 2012-097204

(51) Int. Cl.
*H04N 5/361* (2011.01)
*H04N 5/232* (2006.01)
(Continued)

(52) U.S. Cl.
CPC ............ *H04N 5/2176* (2013.01); *G06T 5/002* (2013.01); *G06T 5/50* (2013.01); *H04N 5/23229* (2013.01); *H04N 5/361* (2013.01); *G06T 2207/20212* (2013.01)

(58) Field of Classification Search
CPC ....... G06T 5/002; G06T 5/005; G06T 5/006; G06T 2207/20182; G06T 5/50; G06K 9/40; H04N 5/217–5/2178; H04N 5/357–5/3675; H04N 5/2176; H04N 5/23229; H04N 5/361; H04N 5/3575; H04N 5/378; H04N 9/045; H04N 5/20329
USPC .......... 348/229, 241–251, 220.1, 362, 222.1, 348/229.1, 230.1, 294, 302, 303; 382/274, 382/275; 358/1.9, 443, 446, 463, 529
See application file for complete search history.

(56) References Cited

U.S. PATENT DOCUMENTS 7,417,669 B2* 8/2008 Kurane .................. H04N 5/361
                                              348/222.1
7,567,277 B2* 7/2009 Inaba .................... H04N 5/3658
                                              348/245

(Continued)

FOREIGN PATENT DOCUMENTS

JP    2003-163839    6/2003
JP    2004-120492    4/2004

(Continued)

OTHER PUBLICATIONS

Extended European Search Report issued Mar. 20, 2015 in Patent Application No. 13778083.9.

(Continued)

*Primary Examiner* — Lin Ye
*Assistant Examiner* — Marly Camargo
(74) *Attorney, Agent, or Firm* — Oblon, McClelland, Maier & Neustadt, L.L.P.

(57) ABSTRACT

An imaging device includes an image sensor to convert an optical image of a subject into an electric signal, an image processor to generate an image according to the electric signal, an image synthesizer to synthesize, pixel-by-pixel, images generated by the image processor in a same composition under a same condition, a digital clamp processor to perform a digital clamp to remove an offset component from a synthesized image obtained by the image synthesizer, and a digital clamp controller to control a digital clamp amount of the digital clamp processor on the basis of a number of images synthesized by the image synthesizer.

11 Claims, 6 Drawing Sheets

(51) Int. Cl.
*H04N 5/217* (2011.01)
*G06T 5/00* (2006.01)
*G06T 5/50* (2006.01)

(56) References Cited

U.S. PATENT DOCUMENTS

| | | | | |
|---|---|---|---|---|
| 7,701,493 B2* | 4/2010 | Mauritzson | ....... | H01L 27/14603 348/241 |
| 7,760,258 B2* | 7/2010 | Huang | ................ | H04N 5/2176 348/241 |
| 8,599,288 B2* | 12/2013 | Oishi | ..................... | H04N 9/045 348/241 |
| 9,019,581 B2* | 4/2015 | Izumi | ................ | H04N 5/3572 358/463 |
| 2002/0140830 A1* | 10/2002 | Shirakawa | ............. | H04N 5/361 348/245 |
| 2007/0127046 A1* | 6/2007 | Soeda | ................ | H04N 1/00005 358/1.9 |
| 2008/0239124 A1* | 10/2008 | Mori | ...................... | H04N 3/155 348/308 |
| 2009/0009614 A1 | 1/2009 | Kawai | | |
| 2010/0026860 A1 | 2/2010 | Oshima | | |
| 2012/0086829 A1 | 4/2012 | Hohjoh | | |

FOREIGN PATENT DOCUMENTS

| | | |
|---|---|---|
| JP | 2009-17078 | 1/2009 |
| JP | 2010-34845 | 2/2010 |
| JP | 2010-187250 | 8/2010 |
| JP | 2013-135343 | 7/2013 |

OTHER PUBLICATIONS

"CCDStack" Retrieved from the Internet: URL: https://web.archive.org/web/20111119045303/http://www.ccdware.com/Files/ccdstack132.pdf, XP55175688A, Nov. 19, 2011, 77 Pages.

International Search Report issued on May 21, 2013 in PCT/JP2013/062151 filed on Apr. 18, 2013.

* cited by examiner

IMAGING DEVICE AND IMAGE PROCESSING METHOD

CROSS REFERENCE TO RELATED APPLICATION

The present application is based on and claims priority from Japanese Patent Application No. 2012-97204, filed on Apr. 20, 2012, the disclosure of which is hereby incorporated by reference in its entirety.

TECHNICAL FIELD

The present invention relates to an image processing of an imaging device such as a still digital camera with an image sensor, in particular, to an imaging device with an image synthesis function and an image processing method for image synthesis.

BACKGROUND ART

A digital camera having an image synthesis function based on brightness is known. Such an image synthesis is to continuously shoot images in time series in the same composition under the same exposure, compare pixel output values of the same coordinates of a reference image and a comparison image, and synthesize the images while replacing the pixels of the reference image with the pixels of the comparison image with a higher output value or a lower output value. By this technique, for example, in photographing night scene, images of star tracks in a background with proper exposure can be captured. Digital cameras with such brightness-based image synthesis function are already available.

Conventionally, for brightness-based image synthesis continuous images are generated with a camera and the images are synthesized by image processing software with a personal computer after shooting. Therefore, a user cannot generate synthesized images at the time of photographing. By use of a digital camera having image synthesis function, a user can check synthesized images during shooting.

Further, for image synthesis with a personal computer, used image data are, for example, JPEG images with noise reduced and compressed when needed, therefore, the quality of the image data may not be good enough for image synthesis depending on photographic setting. Meanwhile, a digital camera can synthesize RAW images so that it can capture minute stars in colors which are likely to be considered as noise in a single frame, and improve image quality by averaging random noises in synthesizing process, which is not feasible by general image processing.

Meanwhile, there is a problem in the synthesis of RAW images with the occurrence of noises from which the JPEG images are free because RAW images are raw output data from an image sensor not subjected to image processing. Due to shot noises or random noises, even image data of the same subject captured at the same setting cannot be the same output and is an output with probability distribution. While repeating a simple brightness-based image synthesis on pixels at the corresponding coordinates, the outputs gradually approach the maximal value of the distribution, resulting in generation of defective images such as over-exposure images or magenta-like images. This problem does not occur with JPEG images subjected to a digital clamp or noise reduction.

Japanese Patent No. 4243084 (Reference 1) and Japanese Patent Application Publication No. 2010-34845 (Reference 2) disclose an imaging device to deal with failures such as a misadjustment or unevenness of a black level, for example. Reference 1 discloses an imaging device to adjust clamping to RAW images in accordance with parameters for photographic conditions so as to reduce a variation in black level. It generates clamp signals properly in accordance with exposure data or temperature data in long exposure shooting or under a high ambient temperature. Reference 2 discloses a technique to tentatively increase an OB signal defining the black level in clamp processing to stabilize the black level, thereby preventing degradation in image quality due to a variation in the black level. However, the techniques in the two references cannot deal with variation or unevenness in the black level caused by brightness-based image synthesis of RAW images.

As described above, in synthesizing RAW images with an imaging device such as a digital camera having a brightness-based image synthesis function, a variation, unevenness or misadjustment in the black level may occur in accordance with a photographic condition under which RAW images are captured, an ambient condition, or a synthesis condition such as the number of images synthesized.

DISCLOSURE OF THE INVENTION

The present invention aims to provide an imaging device and an image processing method which can properly deal with a variation in black level in accordance with the number of images synthesized in brightness-based image synthesis of RAW images to effectively prevent degradation in the quality of synthesized images.

According to one embodiment, an imaging device includes an image sensor to convert an optical image of a subject into an electric signal, an image processor to generate an image according to the electric signal, an image synthesizer to synthesize, pixel-by-pixel, images generated by the image processor in a same composition under a same condition, a digital clamp processor to perform a digital clamp to remove an offset component from a synthesized image obtained by the image synthesizer, and a digital clamp controller to control a digital clamp amount of the digital clamp processor on the basis of a number of images synthesized by the image synthesizer.

BRIEF DESCRIPTION OF THE DRAWINGS

Features, embodiments, and advantages of the present invention will become apparent from the following detailed description with reference to the accompanying drawings.

DESCRIPTION OF EMBODIMENTS

Hereinafter, an imaging device and an image processing method according to an embodiment of the present invention will be described in detail with reference to the accompanying drawings. Wherever possible, the same reference numbers will be used throughout the drawings to refer to the same or like parts.

First, brightness-based image synthesis is described. By the brightness-based image synthesis in which the pixel outputs at the same coordinates of multiple images are compared to replace the pixels with the ones with a higher or lower brightness, an imaging device can easily generate an image of star tracks, for example, even dark or thin color stars, which is not feasible by a silver-salt film camera. However, since RAW images are used, simple comparison of the pixel output values for pixel replacement causes increases in the total output level of an image due to shot noises or random noises. This results in increasing the black level and adding an offset to the output, thereby generating a magenta tone image.

In view of this, the imaging device according to one embodiment is configured to store data on the number of RAW images synthesized, and a variation distribution in the black level of a synthesized image relative to photographic conditions or ambient conditions, and perform digital clamp to remove offset components of a synthesized image in accordance with the data. Thereby, it can more properly generate synthesized images in high quality using RAW images than using JPEG images, with noises taken into consideration.

Figure 1:
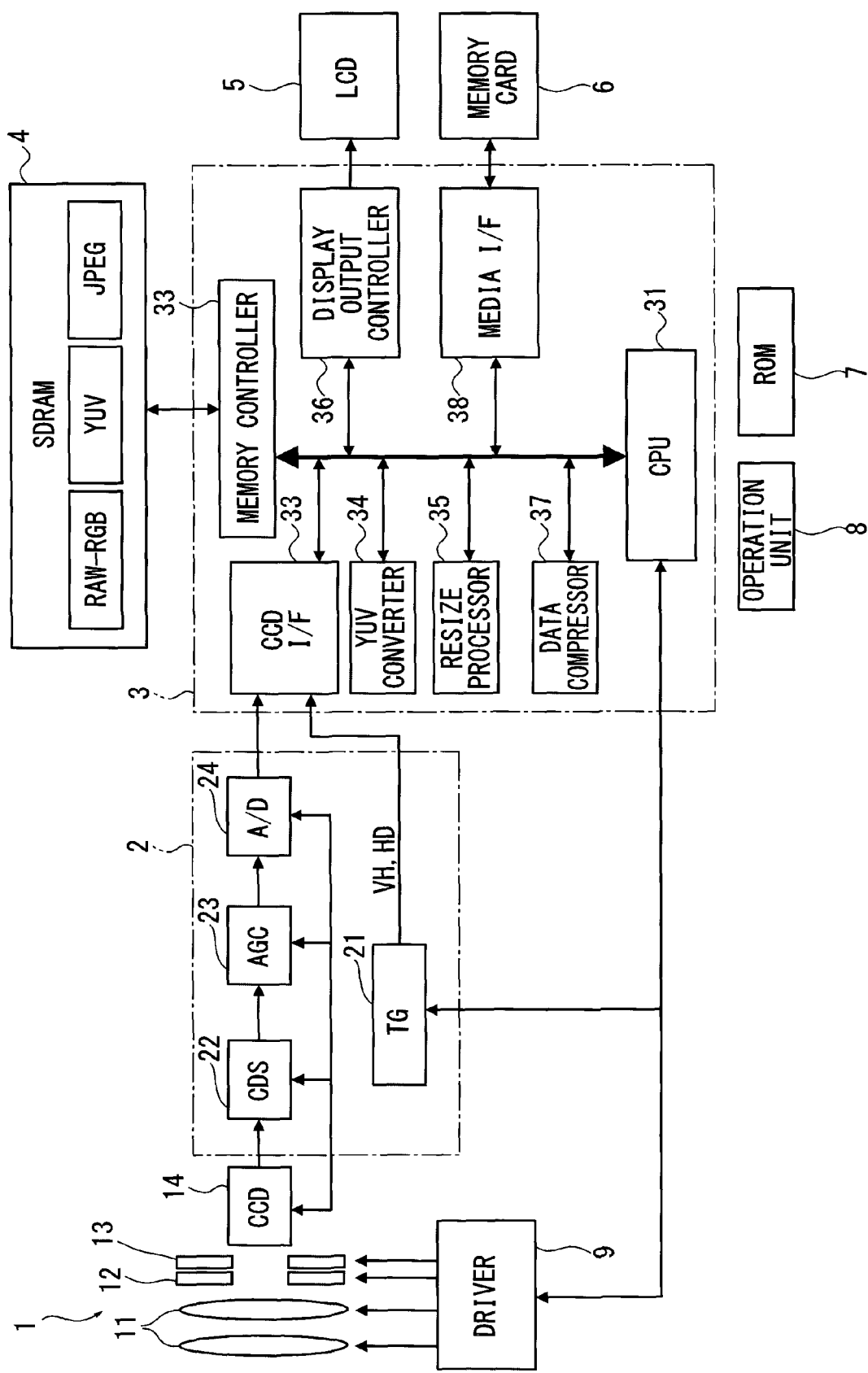
FIG. 1 is a block diagram of the essential part of a digital camera as an example of an imaging device according to one embodiment.

FIG. 1 is a block diagram of a system configuration of a digital camera as an example of the imaging device. The digital camera comprises an optical system 1, an analog front end 2, a signal processor 3, an SDRAM 4, an LCD 5, a memory card 6, an ROM 7, and an operation unit 8, and a driver 9.

The optical system 1 includes a lens group 11, an aperture diaphragm 12, a shutter 13, and an image sensor 14. The analog front end 2 includes a timing generator (TG) 21, a coupled double sampling (CDS) circuit 22, an analog gain control (AGC) circuit 23, and an A/D converter 24. The signal processor 3 includes a CPU 21 as a controller, a CCD interface (I/F) 32, a memory controller 33, a YUV converter 34, a resize processor 35, a display output controller 36, a data compressor 37, and a media interface (I/F) 38.

The optical system 1 can include an ND (neutral density) filter. The image sensor can be a CCD or a CMOS. With use of a CMOS, the analog front end 2 becomes unnecessary as an external circuit since it is generally incorporated in the CMOS.

The CDS circuit 22 removes noises from output signals of the image sensor, and the AGC circuit 23 amplifies the signals when needed. The A/D converter 24 converts analog image signals to digital image data. The timing generator 21 generates drive timing signals to the image sensor 14 and the elements of the analog front end 2.

The CPU 31 is connected to the CCD I/F 32, memory controller 33, YUV converter 34, resize processor 35, display output controller 36, data compressor 37 and media I/F 38 to perform data communication with them and control them. The memory controller 33 is connected to the SDRAM 4, the display output controller is connected to the LCD 5, and the media I/F 38 is connected to the memory card 6. Further, the CPU 31 is connected to the ROM 7 storing operation programs and the operation unit 8 having buttons and switches with which data are input. The CPU 31 also controls the driver 9 for the lens group 11, aperture diaphragm 12, and shutter 13.

Figure 2:
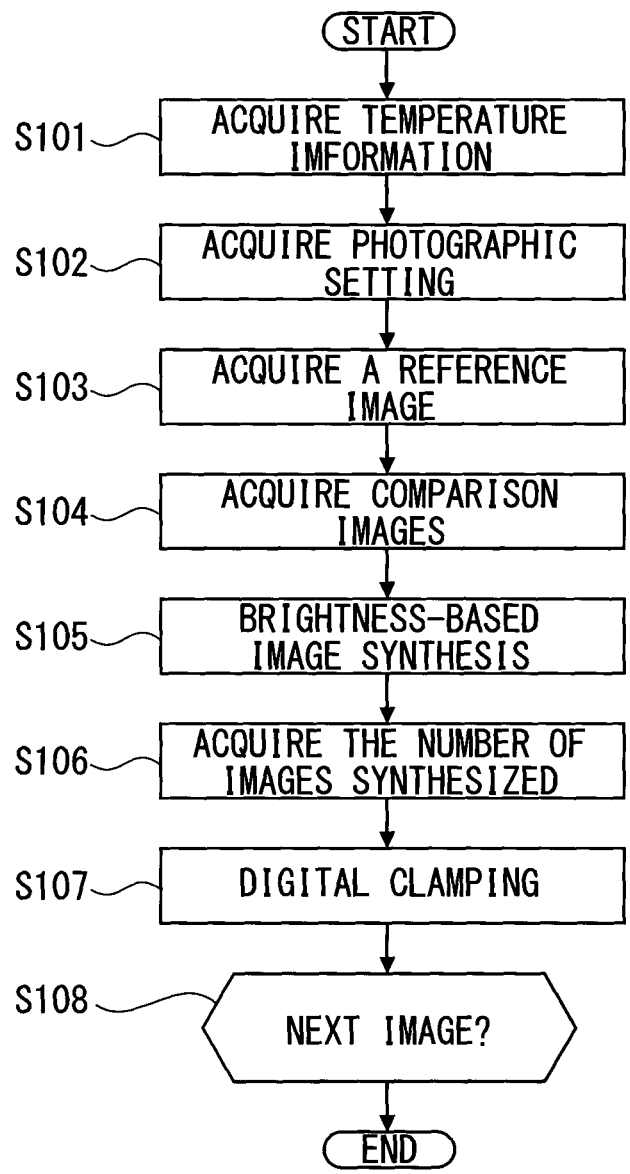
FIG. 2 is a flowchart for brightness-based image synthesis including digital clamp processing of the digital camera in FIG. 1 in accordance with the number of images synthesized by way of example.

FIG. 2 is a flowchart for brightness-based image synthesis processing of the digital camera in FIG. 1 including digital clamp with a black level variation taken into account by way of example. This image synthesis is executed by the CPU 31 of the signal processor 3. In the brightness-based image synthesis according to the present embodiment RAW images are properly subjected to digital clamp by adjusting a digital clamp amount in accordance with the number of synthesized images, ambient temperature, and photographic settings. Thereby, the black level of a synthesized image can be appropriately corrected.

In FIG. 2 RAW images are assumed to be captured continuously in time series in the same composition under the same exposure and photographic condition including ISO sensitivity by the digital camera on a tripod. The images can include a moving subject.

In step S101 ambient temperature is measured with a not-shown temperature sensor of the digital camera and the measured temperature is maintained. In step S102 data on photographic condition as exposure and sensitivity are acquired and maintained. In step S103 a first RAW image as a reference image is acquired and then subsequent RAW images as comparison images are acquired in step S104 for the brightness-based image synthesis. In step S105 first to N-th (N=2 or more) RAW images are subjected to brightness-based image synthesis repeatedly to generate a synthesized image while replacing the pixels of the reference image with the pixels of the comparison images with a higher brightness value. In step S106 the number of RAW images synthesized is counted as a parameter for digital clamping.

To prevent misadjustment and unevenness in the black level due to noises, in the present embodiment the black level of a synthesized image is properly corrected by digital clamp to shift the brightness of image data. Weighted average method can be added to the brightness-based image synthesis so as not to conduct pixel replacement for the same subject. In this case the range of weighted average needs to be determined by parameters. However, there will be a tradeoff between the accuracy of brightness-based image synthesis and misadjustment and unevenness in the black level. That is, without the addition of the weighted average, the black level of a synthesized image has to be properly corrected.

For a simple brightness-based image synthesis, a noise distribution in a synthesized image can be decreased by reducing noises in the reference and comparison images used for the synthesis but a noise distribution cannot be eliminated and remains even at smaller absolute values.

Therefore, the larger the number of images synthesized is, the more conspicuous the misadjustment and unevenness of the black level becomes. Further, each of RAW images to be synthesized can be subjected to dark frame subtraction, however, a noise distribution cannot be eliminated either and noise reduction is thus not sufficiently effective.

Returning to the flowchart, in step S107 the synthesized image in step S105 is subjected to digital clamp. The black levels of the first to N-th RAW images are different depending on ambient temperature, photographic condition such as ISO sensitivity, exposure time, white balance, amount of peripheral light, the number of images synthesized N, and coordinates in a frame. Thus, an enormous amount of parameters and tables of combinations of calculations are needed for digital clamp. Herein, a minimal necessary amount of calculations is performed with the characteristics of black level obtained by experiment and measurement (as later described) taken into account.

The black level does not change till about ambient temperature 0 degree to 20 degrees C., but does change over 20 degrees C. depending on exposure time. Thus, over the temperature 20 degrees C., omitting calculations relative to the ambient temperature makes it possible to greatly reduce the amount of parameters and tables of calculations although the effect of black level correction may be slightly decreased in high temperature portions depending on photographic condition.

Sensitivity such as ISO sensitivity is approximately proportional to the black level. That is, if ISO sensitivity is doubled relative to a gain of the image sensor, random noise is approximately doubled accordingly. By using pre-stored data on the black level in association with the ISO sensitivity, it is possible to accurately calculate the black level by a simple operation.

Regarding the exposure time, the black level is constant in image center areas irrespective of the amount of exposure time. However, in image top left portions, for example, the black level tends to increase in proportion to the amount of exposure time probably because thermal noise distribution in frames is not even. In the present embodiment black level data at each coordinate of a frame according to exposure time are stored in a memory. The digital clamp is performed using this data in accordance with ISO sensitivity only and ambient temperature data is not used for the calculation.

Further, with regard to the number of images synthesized, the black level also changes at different coordinates in a frame but can be approximated by logarithm function. That is, the black level L (N) of the N-th image is expressed by the following equation:

$$L(N) = (A * Ln(X) + B) * L(1)$$

where X is the number of images synthesized at one point in a frame and A, B are coefficients for finding a change in the black level at each point when the number of images is increased.

The black level data to be stored in the memory are values of each point of a frame of a first image at each exposure time and the coefficients (A, B). The coordinates in a frame are ideally every pixel, however, it can be thinned with memory capacity taken into consideration.

In step S107 a found digital clamp amount is subtracted from the synthesized image in the digital clamp process to output an obtained image to the SDRAM 4 via the memory controller 33 of the signal processor 3 or to the LCD 5 via the display output controller 36. Then, if there is a next image to be synthesized in step S108, the flow returns to step S105 and the above steps are repeated. This flow can apply to image synthesis by replacing pixels with pixels with a lower brightness value.

Figure 3:
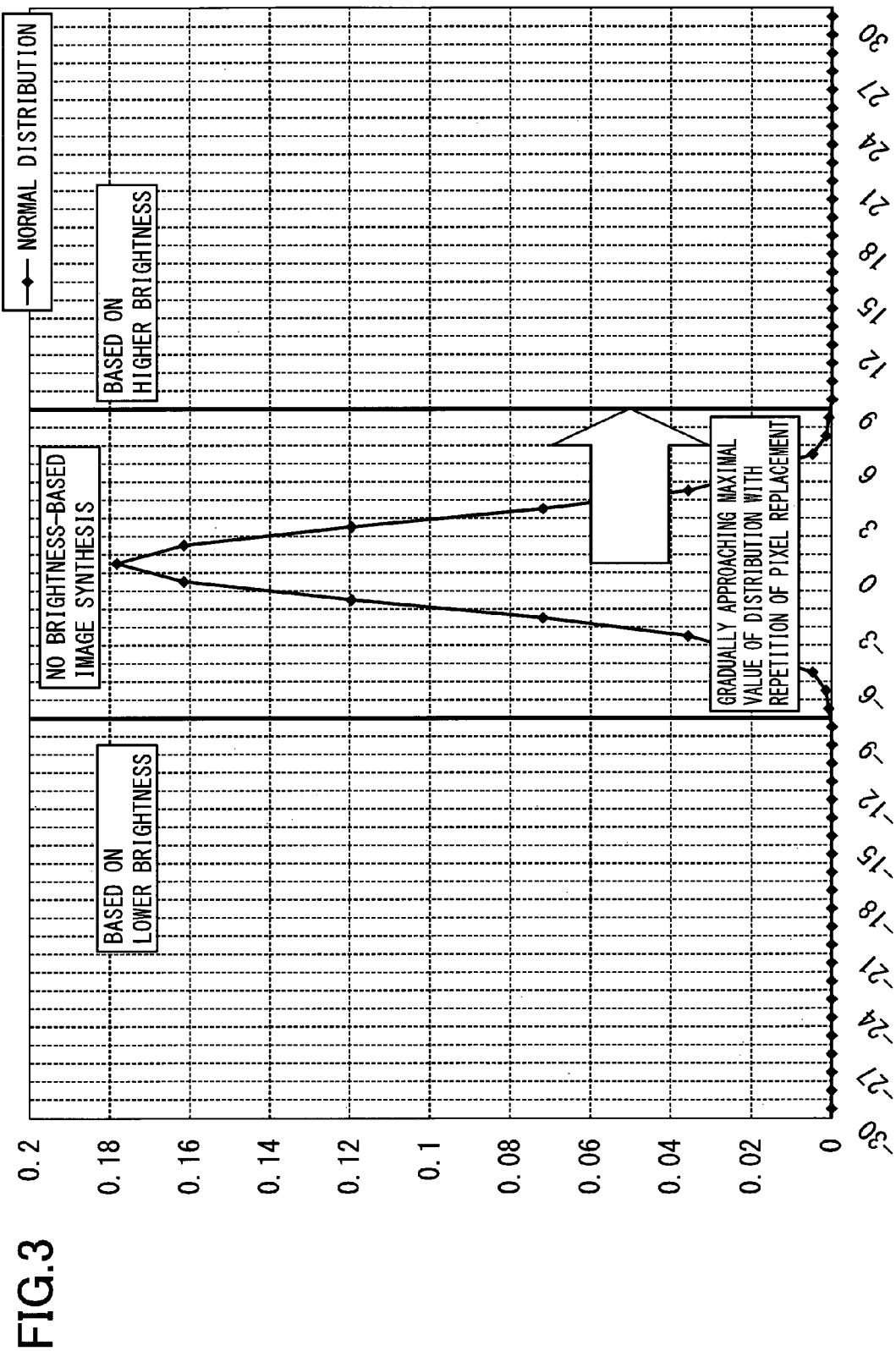
FIG. 3 is a graph showing a noise distribution relative to signed differential values of a reference image and a comparison image by way of example.

Next, a problem in a simple brightness-based image synthesis without the use of the present invention is described. In general the pixel outputs of RAW images of the same subject captured under the same photographic condition are not the same due to noises. By a simple brightness-based image synthesis, the outputs gradually approach the maximal value of a noise distribution as shown in FIG. 3. In FIG. 3 a normal distribution $\sigma^2=5$ is assumed as a noise distribution model.

In view of this, according to the present embodiment the maximal value of a noise distribution is set to a threshold, and brightness-based image synthesis is conducted only to the pixels with outputs equal to or over or below the threshold.

Figure 4:
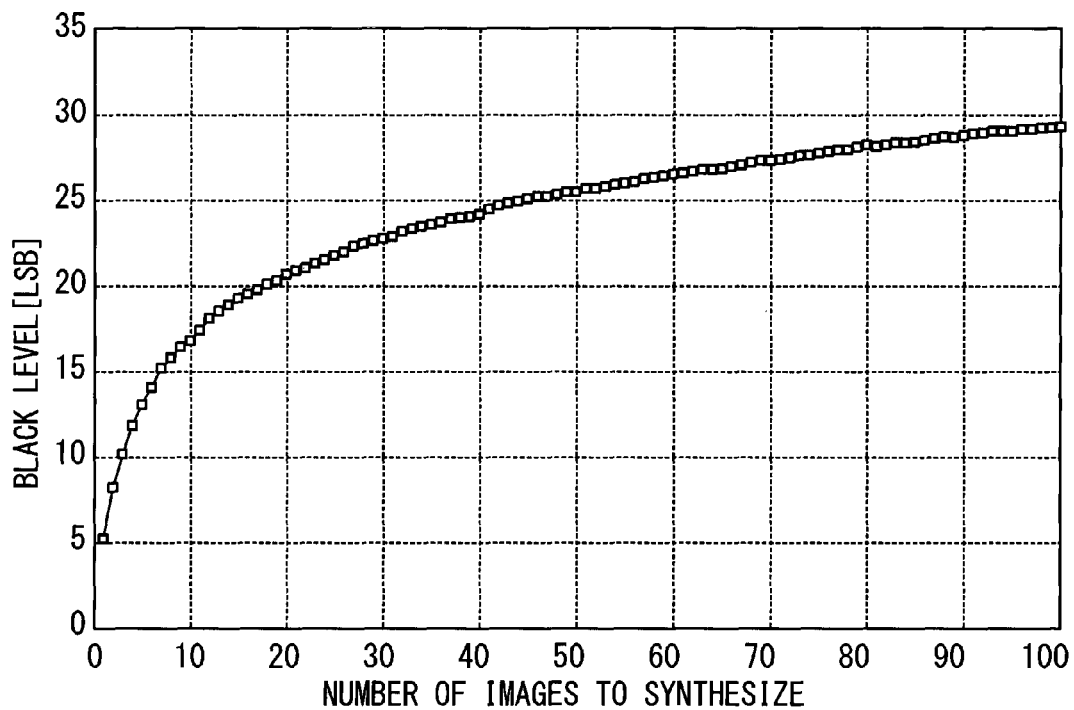
FIG. 4 is a graph showing a variation in black level relative to the number of images synthesized when RAW images are repeatedly subjected to a simple brightness-based image synthesis with a related art digital camera in an optically shielded state by way of example.

FIG. 4 shows the results of experiment in which RAW images are repeatedly subjected to the brightness-based image synthesis with a digital camera in a shaded state by way of example. A digital camera, RICOH GR DIGITAL IV manufactured by RICOH Co. Ltd. is used at ISO 400, exposure time 15 seconds, and F-value 9.0. In FIG. 4 the mean values of the black level of a center area of 50 by 50 pixels in a frame of 3,672 by 2,748 pixels are plotted. As seen from the drawing, a first image exerts a black level of about 5 [LSB] in full scale, 12-bit equivalent, and the black level increases as the number of images increases and that of a $100^{th}$ image is near 30 [LSB]. Such a high black level is visually recognizable as grayish black. In a night scene, for example, a dark sky is represented in a magenta-like color.

In view of this, in the present embodiment data on a variation in the black level in accordance with the number of images synthesized are prepared and stored in the memory. Thus, the misadjustment of the black level as grayish black can be prevented by adjusting the digital clamp amount in line with the number of images synthesized. Further, a variation in the black level changes depending on ambient temperature, exposure time, the coordinates of an image and the characteristics of the image sensor so that the digital clamp amount needs to be adjusted according to these factors in the digital clamp process.

Figure 5:
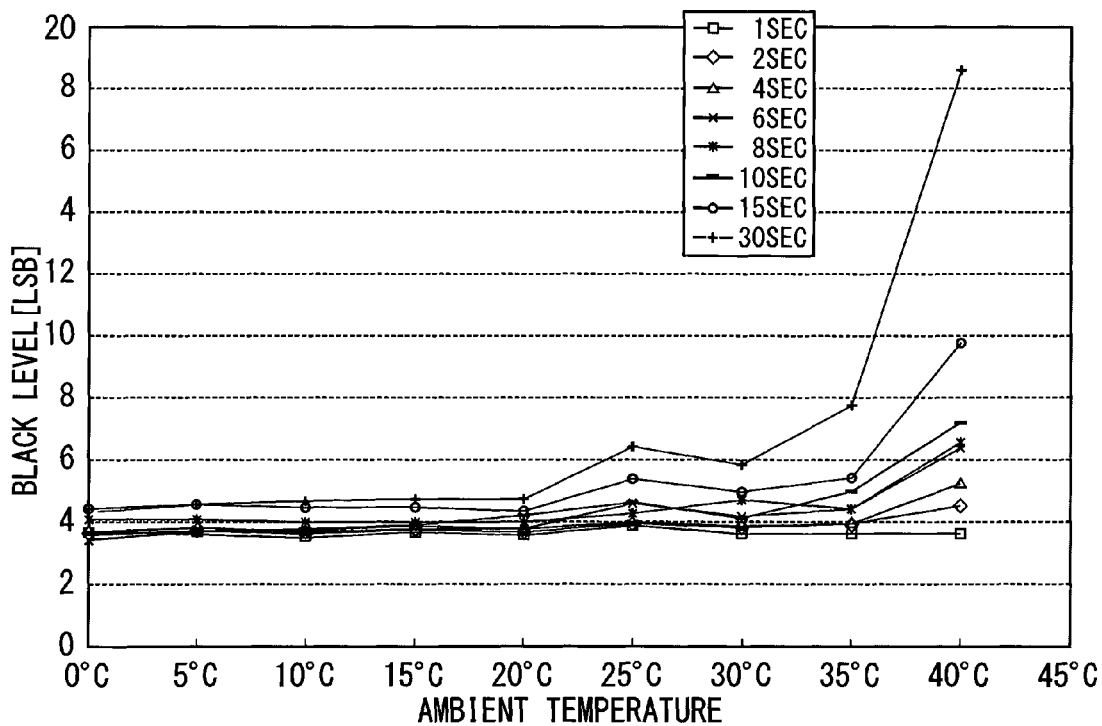
FIG. 5 is a graph showing differences in the black level of images captured with the shielded digital camera in FIG. 4 in accordance with ambient temperature and exposure time by way of example.

FIG. 5 shows a variation in the black level due to ambient temperature when the digital camera, RICOH GR DIGITAL IV is used at ISO 400, exposure time 1 to 30 seconds, and F-value 9.0. The mean values of the black level of a center area of 50 by 50 pixels in the size 3,672 by 2,748 pixels of a $1^{st}$ image are plotted.

It is seen from the graph that under high-temperature environment the black level tends to be higher than under normal-temperature environment because of an increase in dark currents, and how high the black level will be also differs depending on the amount of exposure time. For instance, at exposure time 1.0 second, the black level does not change from a low to high temperature. Meanwhile, at exposure time 30 seconds, the black level worsens conspicuously at high temperatures.

Figure 6:
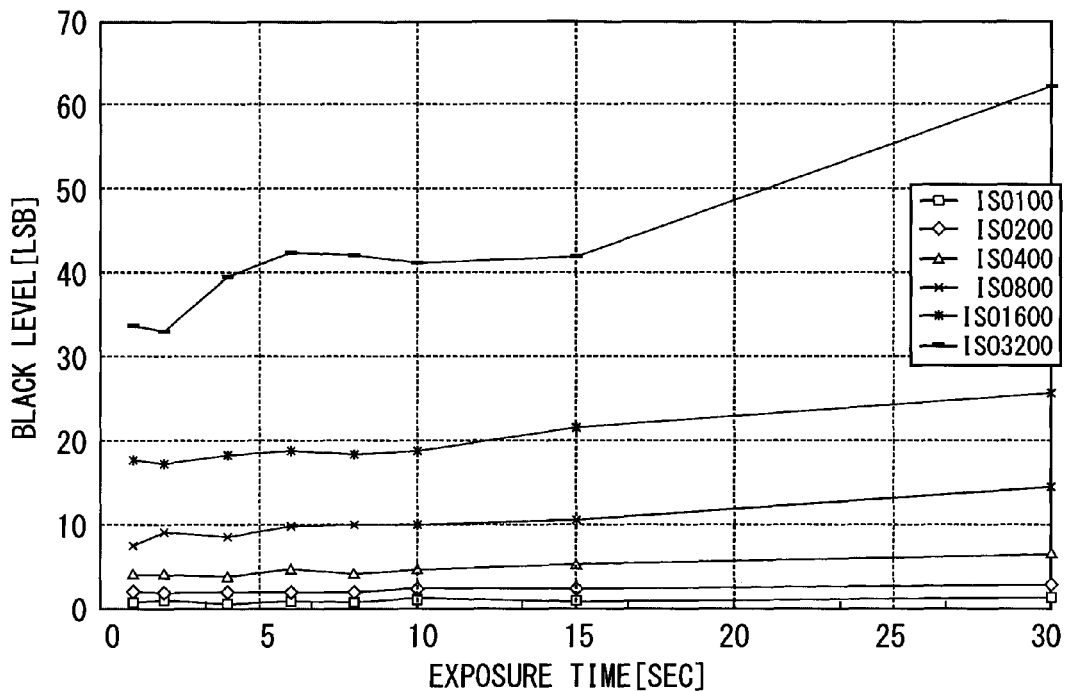
FIG. 6 is a graph showing differences in the black level of images captured with the shielded digital camera in FIG. 4 in accordance with sensitivity and exposure time by way of example.

FIG. 6 shows a variation in the black level by exposure time when the digital camera, RICOH GR DIGITAL IV is used at ISO 100 to 3,200, exposure time 1 to 30 seconds, and F-value 9.0. The mean values of the black level of a center area of 50 by 50 pixels in the size of 3,672 by 2,748 pixels of a $1^{st}$ image at ambient temperature 25 degrees C. are plotted. As apparent from the graph, the black level is correlated with exposure time and approximately proportional to ISO sensitivity.

Figure 7:
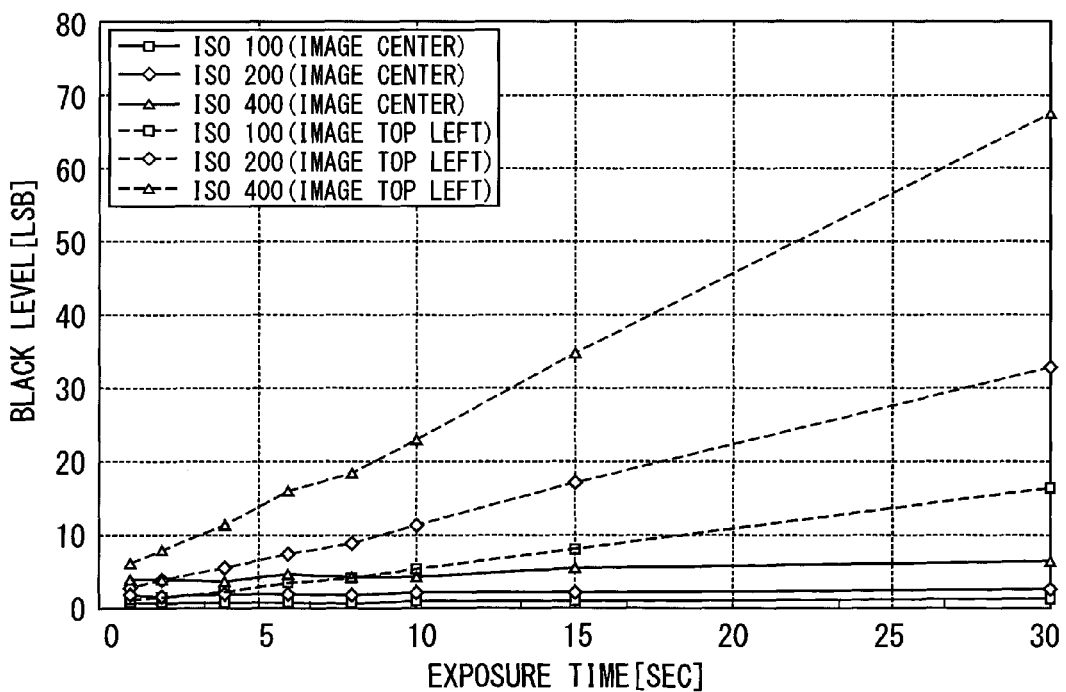
FIG. 7 is a graph showing differences in the black level of images at different coordinates captured with the shielded digital camera in FIG. 4 in accordance with sensitivity and exposure time by way of example.

FIG. 7 shows differences in the black level at different coordinates in an image frame when the digital camera, RICOH GR DIGITAL IV is used under normal ambient temperature of 25 degree C. at ISO 100 to 400, exposure time 1 to 30 seconds, and F-value 9.0. The mean values of the black levels of a center area and a top left area of 50 by 50 pixels in the size of 3,672 by 2,748 pixels of a 1$^{st}$ image are plotted. The characteristics of the black level of the center area are plotted by a solid line and those of the top left area are plotted by a broken line. In the central area the black level does not change much while in the top left area the black level increases in proportion to the amount of exposure time. Specifically, at ISO 400 and exposure time 30 [sec] the black level of the center area is about 6 [LSB] while that of the top left area is about 67 [LSB], for example.

Figure 8:
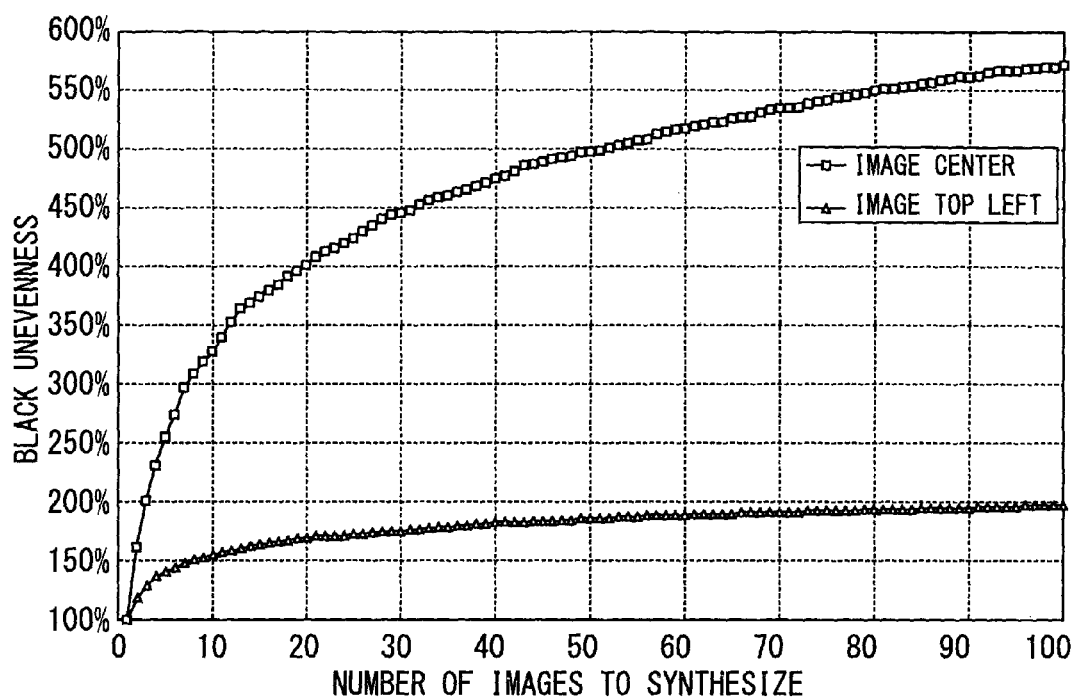
FIG. 8 is a graph showing a variation in the black level of images at different coordinates in accordance with the number of images synthesized by way of example.

FIG. 8 shows a variation in the black level in accordance with the number of images synthesized as in FIG. 4 when the digital camera, RICOH GR DIGITAL IV is used at ISO 400, exposure time 15 seconds, and F-value 9.0. The mean values of the black levels of a center area and a top left area of 50 by 50 pixels in the size of 3,672 by 2,748 pixels of a 1$^{st}$ image at normal ambient temperature of 25 degrees C. are plotted.

When the black level of a first image is set as a reference (100%) in FIG. 8, the black level differently varies between the image center area and top left area. Thus, the digital clamp amount needs to be calculated differently depending on the position in a frame.

Figure 9:
FIG. 9 shows an image with unevenness in black level distribution generated using RAW images by brightness-based image synthesis of a related art digital camera when optically shielded.

FIG. 9 shows an example of image data captured with a digital camera in a shaded state. Note that the image data is tone-adjusted for the sake of clearly showing black unevenness. FIG. 9 clearly shows unevenness in the black level of an image frame. With use of a CCD solid image sensor as the image sensor 14, the black level unevenness is very noticeable because thermal noise distribution is uneven in a frame due to heat from amplifiers and peripheral circuits located in the area corresponding to the image top left area. Accordingly, different parameters need to be used for the digital clamp processing.

Although the present invention has been described in terms of exemplary embodiments, it is not limited thereto. It should be appreciated that variations or modifications may be made in the embodiments described by persons skilled in the art without departing from the scope of the present invention as defined by the following claims.

The invention claimed is:

1. An imaging device comprising:
an image sensor to convert an optical image of a subject into an electric signal;
an image processor to generate an image according to the electric signal;
an image synthesizer to synthesize, pixel-by-pixel, images generated by the image processor in a same composition under a same condition;
a digital clamp processor to perform a digital clamp to remove an offset component from a synthesized image obtained by the image synthesizer; and
a digital clamp controller to adjust a digital clamp amount of the digital clamp processor in correspondence with a number of images synthesized by the image synthesizer,
wherein the image synthesizer includes a synthesizer to compare, pixel-by-pixel, on the basis of a brightness value, corresponding coordinates of the images generated in the same composition under the same condition and synthesize the images while replacing a pixel with at least either a pixel having a higher brightness value or a pixel having a lower brightness value.

2. The imaging device according to claim 1, wherein the digital clamp controller includes a first controller to control a change amount of the digital clamp amount in accordance with at least one of sensitivity, white balance, exposure time, a correction amount of peripheral light amount, and ambient temperature.

3. The imaging device according to claim 1, wherein the digital clamp controller includes a second controller to control at least either a change amount of the digital clamp amount in accordance with a different characteristic for each color of pixels corresponding to the coordinates of the synthesized image.

4. The imaging device according to claim 1, wherein the digital clamp controller includes a third controller to control at least either a change amount of the digital clamp amount in accordance with the coordinates of the synthesized image.

5. The imaging device according to claim 1, wherein the adjustment of the digital clamp amount increases in correspondence with an increase in the number of synthesized images and decreases in correspondence with a decrease in the number of synthesized images.

6. An image processing method, comprising:
converting an optical image of a subject into an electric signal;
generating an image according to the electric signal;
synthesizing, pixel-by-pixel, images generated in a same composition under a same condition;
performing a digital clamp to remove an offset component from a synthesized image obtained in said synthesizing; and
adjusting a digital clamp amount in accordance with a number of images synthesized in said synthesizing,
wherein said digital clamp adjusting includes comparing, pixel-by-pixel, based on a brightness value, corresponding coordinates of the images generated in the same composition under the same condition and synthesizing the images while replacing a pixel with at least either a pixel having a higher brightness value or a pixel having a lower brightness value.

7. The image processing method according to claim 6, wherein said digital clamp adjusting includes controlling a change amount of the digital clamp amount in accordance with at least one of sensitivity, white balance, exposure time, a correction amount of peripheral light amount, and ambient temperature.

8. The image processing method according to claim 6, wherein said digital clamp adjusting includes controlling at least either a change amount of the digital clamp amount in accordance with a different characteristic for each color of pixels corresponding to the coordinates of the synthesized image.

9. The image processing method according to claim 6, further comprising:
controlling at least either a change amount of the digital clamp amount in accordance with the coordinates of the synthesized image.

10. The image processing method according to claim 6, wherein said adjusting includes increasing the digital clamp amount in correspondence with an increase in the number of synthesized images and decreasing the digital clamp amount in correspondence with a decrease in the number of synthesized images.

11. An imaging device comprising:
an image sensor to convert an optical image of a subject into an electric signal;

an image processor to generate an image according to the electric signal;

an image synthesizer to synthesize, pixel-by-pixel, images generated by the image processor in a same composition under a same condition;

a digital clamp processor to perform a digital clamp to remove an offset component from a synthesized image obtained by the image synthesizer; and a digital clamp controller to adjust a digital clamp amount of the digital clamp processor in correspondence with a number of images synthesized by the image synthesizer, wherein the adjustment of the digital clamp amount increases in correspondence with an increase in the number of synthesized images and decreases in correspondence with a decrease in the number of synthesized images.

* * * * *